United States Patent
Rodbro et al.

(10) Patent No.: US 8,340,136 B2
(45) Date of Patent: Dec. 25, 2012

(54) METHOD OF TRANSMITTING DATA IN A COMMUNICATION SYSTEM

(75) Inventors: Christoffer Rodbro, Stockholm (SE); Soren Skak Jensen, Stockholm (SE); Soren Vang Andersen, Aalborg (DK)

(73) Assignee: Skype, Dublin (IE)

(*) Notice: Subject to any disclaimer, the term of this patent is extended or adjusted under 35 U.S.C. 154(b) by 143 days.

(21) Appl. No.: 12/004,449

(22) Filed: Dec. 20, 2007

(65) Prior Publication Data
US 2008/0232521 A1    Sep. 25, 2008

(30) Foreign Application Priority Data
Mar. 20, 2007   (GB) .................................. 0705327.5

(51) Int. Cl.
*H04J 3/06* (2006.01)
(52) U.S. Cl. ........ 370/503; 370/241; 370/252; 370/464; 370/498; 375/354; 375/355; 375/356; 375/357; 375/358
(58) Field of Classification Search .................. 370/241, 370/252, 464, 498, 403, 503; 375/354–376
See application file for complete search history.

(56) References Cited

U.S. PATENT DOCUMENTS

| | | | | |
|---|---|---|---|---|
| 6,480,902 B1 * | 11/2002 | Yuang et al. | | 709/248 |
| 6,661,810 B1 * | 12/2003 | Skelly et al. | | 370/516 |
| 6,842,424 B1 * | 1/2005 | Key et al. | | 370/236 |
| 7,012,893 B2 * | 3/2006 | Bahadiroglu | | 370/231 |
| 7,170,901 B1 * | 1/2007 | Katzur | | 370/412 |
| 2003/0169755 A1 * | 9/2003 | Ternovsky | | 370/412 |
| 2003/0212535 A1 * | 11/2003 | Goel | | 703/2 |
| 2004/0057446 A1 * | 3/2004 | Varsa et al. | | 370/412 |
| 2004/0076191 A1 * | 4/2004 | Sundqvist et al. | | 370/516 |
| 2004/0139375 A1 * | 7/2004 | Benesty | | 714/700 |
| 2006/0034338 A1 * | 2/2006 | Degenhardt et al. | | 370/516 |
| 2007/0064679 A1 * | 3/2007 | Chitturi | | 370/352 |

FOREIGN PATENT DOCUMENTS

| | | |
|---|---|---|
| EP | 1 063 800 A2 | 12/2000 |
| WO | WO 2005/009019 A2 | 1/2005 |
| WO | WO 2006/075007 A1 | 7/2006 |

OTHER PUBLICATIONS

Rossi et al, Joint End-to-End Loss-Delay Hidden Markov Model for Periodic UDP Traffic Over the Internet, IEEE Transaction on Signal Processing, vol. 54, No. 2, Feb. 2006, p. 530.*

Kim et al, KALP: a Kalman Filter Based Adaptive Clock Method with Low Pass Prefiltering for Packet Networks Use, IEEE Transactions on Communication, vol. 48, No. 7, Jul. 2000, p. 1217.*

(Continued)

*Primary Examiner* — Charles C Jiang
(74) *Attorney, Agent, or Firm* — Wolfe-SBMC

(57) ABSTRACT

A method of transmitting over a network a signal comprising a plurality of data elements the method comprising; receiving the signal at a terminal; determining a transmission delay of at least one data element; estimating a first component of the transmission delay; determining a second component of the transmission delay by removing the first component of the transmission delay from the transmission delay; and determining a receiver delay to be applied between receiving at the terminal and outputting from the terminal one of said plurality of data elements, in dependence on the second component of the transmission delay.

27 Claims, 5 Drawing Sheets

OTHER PUBLICATIONS

Kim et al, KALP: a Kalman Filter Based Adaptive Clock Method with Low Pass Prefiltering for Packet Networks Use, IEEE Transactions on Communication, vol. 48, No. 7, Jul. 2000, p. 1217.Yensen et al, HMM Delay Prediction Technique for VoIP, IEEE Transaction on Multimedia, vol. 5, No. 3, Sep. 2003, p. 444.*

Yensen et al, HMM Delay Prediction Technique for VoIP, IEEE Transaction on Multimedia, Vol. 5, No. 3, Sep. 2003, p. 444.*

International Search Report for International Application No. PCT/IB2007/003979, mailed on Nov. 14, 2008.

Soo Kim, Kyeong, et al., "KALP: A Kalman Filter-Based Adaptive Clock Method with Low-Pass Prefiltering for Packet Networks Use," *IEEE Transactions on Communications*, 48(7): 1217-1225 (Jul. 2000).

Yensen, Trevor, et al., "HMM Delay Prediction Technique for VoIP," *IEEE Transactions on Communications*, 5(3): 444-457 (Sep. 2003).

Notification of Transmittal of the International Search Report and the Written Opinion of the International Search Report and the Written Opinion of the International Searching Authority for International Application No. PCT/IB2007/003979, date of mailing Feb. 18, 2009.

"Foreign Office Action", Chinese Application No. 200780052265.4, (Jun. 5, 2012), 7 pages.

* cited by examiner

METHOD OF TRANSMITTING DATA IN A COMMUNICATION SYSTEM

RELATED APPLICATION

This application claims priority under 35 U.S.C. § 119 or 365 to Great Britain, Application No. 0705327.5, filed Mar. 20, 2007. The entire teachings of the above application are incorporated herein by reference.

TECHNICAL FIELD

The present invention relates to communication systems. More particularly the present invention relates to a method and apparatus for receiving data transmitted via a communication network.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as speech is input into an analogue to digital converter at the transmitter of one terminal and converted into a digital signal. The digital signal is then encoded and placed in data packets for transmission over a channel to the receiver of another terminal.

One type of communication network suitable for transmitting data packets is the internet. Protocols which are used to carry voice signals over an Internet Protocol network are commonly referred to as Voice over IP (VoIP). VoIP is the routing of voice conversations over the Internet or through any other IP-based network.

A data packet includes a header portion and a payload portion. The header portion of the data packet contains data for transmitting and processing the data packet. This information may include an identification number and source address that uniquely identifies the packet, a header checksum used to detect processing errors and the destination address. The payload portion of the data packet includes information from the digital signal intended for transmission. This information may be included in the payload as encoded frames such as voice frames, wherein each frame represents a portion of the analogue signal.

Degradations in the channel on which the information is sent will affect the information received at the receiving terminal. Degradations in the channel can cause changes in the packet sequence, delay the arrival of some packets at the receiver and cause the loss of other packets. The degradations may be caused by channel imperfections, noise and overload in the channel. This ultimately results in a reduction of the quality of the signal output by the receiving terminal.

When data packets are received at the destination terminal, the information provided in the header of each packet is used to order the received data packets in the correct sequence. In order to ensure that the data in the data packets may be output continuously at the destination terminal, it is necessary to introduce a delay between receiving a data packet and outputting the data in the packet, in order to overcome random variations in the delay between packets arriving at the terminal.

In order to ensure that the data in the data packets may be output continuously at the destination terminal, it is necessary to introduce a delay between receiving a data packet and outputting the data in the packet, in order to over come random variations in the in the delay between packets arriving at the terminal.

A jitter buffer is used at the receiving terminal to introduce a delay between receiving data packets from the network and outputting the data from the terminal. The jitter buffer stores packets temporarily to buffer the variations in the arrival times of packets, such that a decoder can take frames out of the jitter buffer on a continuous basis.

A jitter buffer manager is arranged to control the amount of frames in the jitter buffer over time. The jitter buffer manager may control the number of frames in the jitter buffer, thereby adjusting the delay introduced by the jitter buffer, by requesting that the decoder performs an action that will affect the time that the decoder requires the next frame from the jitter buffer.

In order to delay the time that the decoder requires the next frame, the jitter buffer manager is arranged to request that the decoder inserts a copy of the last frame or extents the play out time of a frame, for example by extending the length of the frame by 20 ms to 30 ms. Conversely in order to reduce the time that the decoder requires the next frame, the jitter buffer manager is arranged to request that the decoder skips a frame or shortens the play out time of a frame. If however the delay introduced by the jitter buffer does not need to be altered the jitter buffer manager may request that the decoder decodes the frame.

Simple jitter buffers introduce a delay by storing a predetermined number of packets, before outputting the data in the packets. However it is advantageous to adapt the number of packets stored in the buffer to effectively handle changing network conditions. Therefore, in some methods known in the art, the number of frames to be stored in the jitter buffer may be calculated adaptively.

The longer the delay introduced by the jitter buffer, the less the risk that a packet will be delayed beyond the time at which it is needed; on the other hand, a high delay tends to disrupt two way communication. Therefore, it is crucial to determine a reasonable jitter buffer delay.

Usually, the jitter buffer delay is controlled by estimating the amount of network delay for each packet, and then smoothing these values over time. Alternatively, instead of smoothing, a histogram of the packet delays can be kept at the receiver. A target jitter buffer delay may then be chosen to correspond to the most frequently observed delay. However, controlling the adaptation of the delay in this manner does not allow the jitter buffer delay to adapt sufficiently quickly when the conditions of the network change rapidly.

It is therefore an aim of the present invention to improve the perceived quality of the received signal. It is a further aim of the present invention to provide a method of improving the quality of the received signal without the use of complex computational methods.

SUMMARY

According to a first aspect of the present invention there is provided a method of transmitting over a network a signal comprising a plurality of data elements the method comprising; receiving the signal at a terminal; determining a transmission delay of at least one data element; estimating a first component of the transmission delay; determining a second component of the transmission delay by removing the first component of the transmission delay from the transmission delay; and determining a receiver delay to be applied between receiving at the terminal and outputting from the terminal one of said plurality of data elements, in dependence on the second component of the transmission delay.

According to a second aspect of the present invention there is provided a method of transmitting over a network a signal comprising a plurality of data elements comprising; receiving the signal at a terminal; determining if a network propagation state is in a first network propagation state or a second network propagation state; determining a periodicity between occasions that the second network propagation state occurs; predicting when the next second network propagation state will occur based on the determined periodicity; adjusting a delay applied between receiving at the terminal and outputting from the terminal one of said plurality of data elements in dependence on the prediction of the next second network propagation state.

According to a third aspect of the present invention there is provided a method of processing at a terminal a signal comprising a plurality of data elements, the method comprising; receiving the signal at a terminal; storing at least one received data element of the signal in a data store; periodically requesting a data element from the data store; determining the number of requests occurring between receiving a first data element and a second data element to determine a transmission delay of the second data element; and controlling when the at least one data element is output from the data store in dependence on the transmission delay of the second data element.

According to a fourth aspect of the present invention there is provided a device arranged to receive a signal transmitted over a network comprising; a receiver arranged to receive the signal comprising a plurality of data elements; a determiner arranged to determine a transmission delay of at least one data element; an estimator arranged to estimate a first component of the transmission delay and to determine a second component of the transmission delay by removing the first component of the transmission delay from the transmission delay; and a delay unit arranged to apply a receiver delay between receiving at the terminal and outputting from the terminal one of said plurality of data elements, in dependence on the second component of the transmission delay.

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Figure 1:
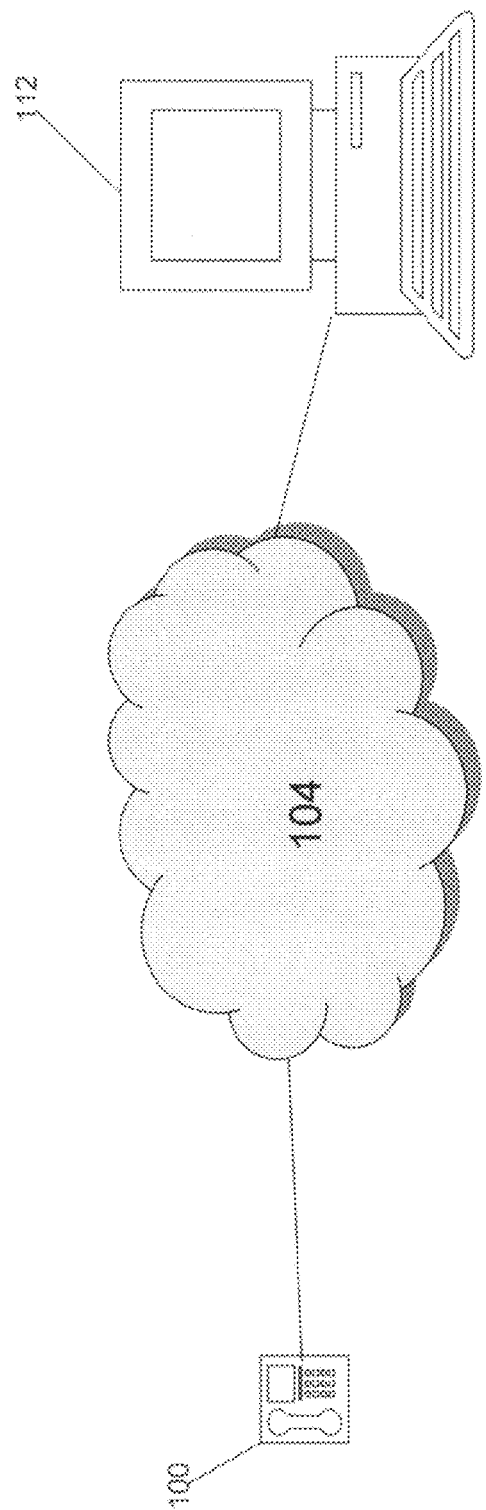
FIG. 1 is a communication network.

Reference will first be made to FIG. 1, which shows a terminal 100 and a terminal 112 connected to a communication network 104. The terminal 100 is arranged to transmit data packets to the terminal 112 via the communication network 104. In one embodiment of the invention the communications network is a VoIP network provided by the internet. It should be appreciated that even though the exemplifying communications system shown and described in more detail herein uses the terminology of a VoIP network, embodiments of the present invention can be used in any other suitable communication system that facilitates the transfer of data.

The terminals 100 and 112 may be, for example, a personal computer, a gaming device, a personal digital assistant, a suitably enabled mobile phone, a television or other device able to connect to the network 104.

The inventors of the present invention have identified that the variations in the observed transmission delay comprise two main components. One component of the variations in the observed transmission delay is a continuously increasing or decreasing delay caused by the offset between the clock frequency at the transmitting terminal 100 and the clock frequency at the receiving terminal 112. This is referred to as the clock skew delay.

The clock skew delay component is not representative of a physical delay caused by the propagation of the signal but rather an artifact resulting from the difference between clock frequency at the transmitting terminal and the receiving terminal. More particularly the difference in the clock frequency at the transmitting terminal and the receiving terminal causes a difference between the rate at which data frames are generated at the transmitting terminal and the rate at which the data frames are required by the receiving terminal. As such if the rate at which data frames are required at the receiving terminal is higher than the rate at which data rates are transmitted from the transmitting terminal this will result in an increasing delay between when a frame is required at the receiving terminal and when the frame is received at the terminal.

The second component of the variation in the measured delay is caused by the propagation of the data packet in the network.

Figure 2:
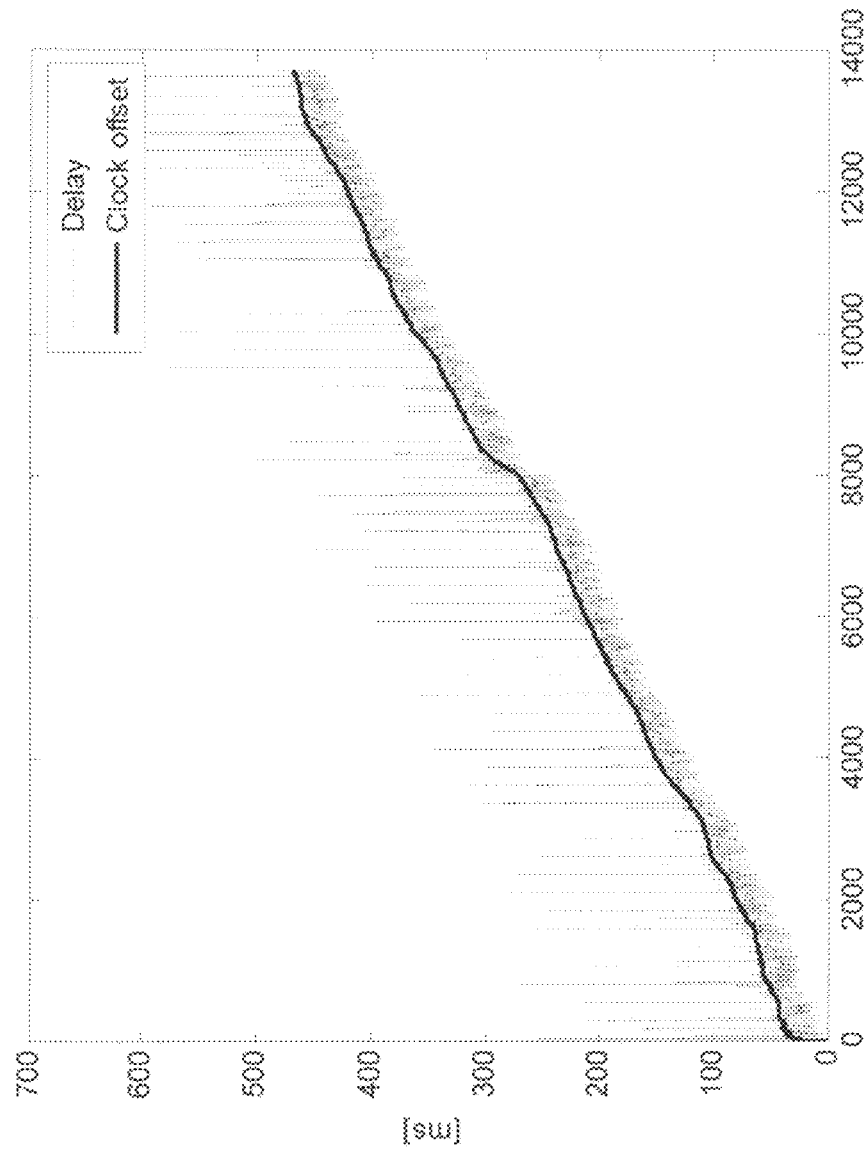
FIG. 2 is a graph showing an example of delay measured at a receiving terminal together with an estimate of clock offset.

FIG. 2 shows a graph of the variation in the measured delay together with an estimated value of the clock skew delay component.

Figure 3:
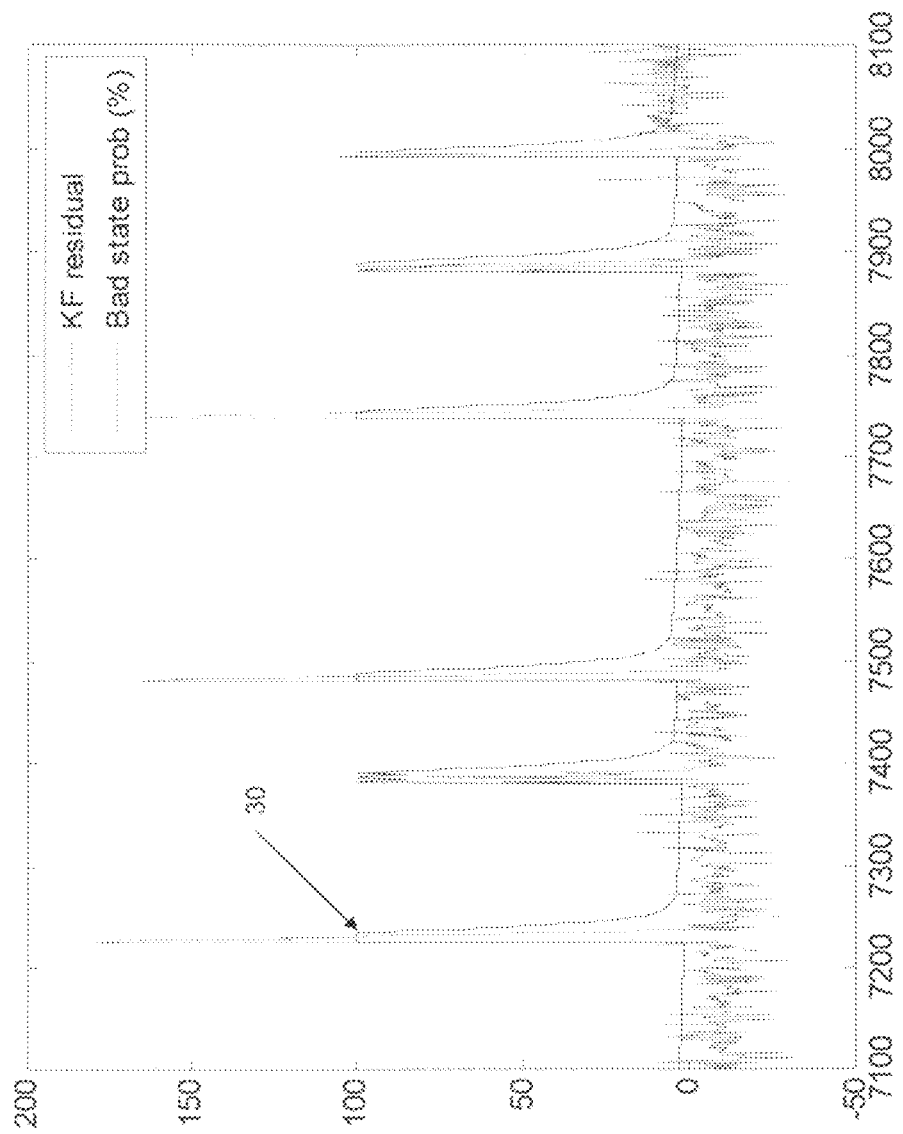
FIG. 3 is an example of the delay measurement compensated for clock offset, together with a probability that the network entered a "bad state"

The inventors of the present invention have identified that by analysing the two components of the measured delay variation separately, a state of the propagation of the signal in the network may be determined by variations in the second component of the delay. In particular, if variations in the second component of the delay are relatively small the propagation of the data packet in the network may be considered to be in a good state. However, if variations in the second component of the delay are comparatively larger the propagation of the data packet in the network may be considered to be in a bad state. This is illustrated in FIG. 3 which shows the delay in the arrival of packets after the delay has been compensated for clock skew. A spike 30 in FIG. 3 indicates that the propagation of the data packet in the network may be considered to be in a bad state.

A state of the propagation of the signal in the network will hereinafter be referred to as a network state.

The inventors of the current invention have discovered that by considering a clock skew component of the measured delay, a target jitter delay may be determined that is more responsive to changing network conditions.

Furthermore, by analysing the two components of delay separately, the changes in the network state may be identified. As such, the network state may be modelled and in some cases predicted which allows adaptations in the jitter buffer delay to be controlled in dependence on the detected or predicted network state.

According to an embodiment of the present invention a time domain filter known as a Kalman filter is used to estimate the clock skew delay in order to provide an output from which the state of the network can be determined.

Kalman filters are known, and are used to estimate continuous hidden variables. A Kalman filter is a time domain filter that uses a previous estimate to compute a current estimate. The Kalman filter has two distinct phases: a predict phase and an update phase. The predict phase uses the previous estimate to produce an estimate of a current value. The update phase is performed to refine the accuracy of the filter. This is achieved by calculating a residual value r(t) which is calculated by subtracting the estimated value from the measured value.

According to an embodiment of the present invention a Kalman filter is used to filter the observed delay of packets arriving at the terminal 112. A residual value r(t) for each packet arrival is calculated by subtracting an estimated value of the clock skew delay from the observed transmission delay. The residual value r(t) thus indicates the delay variation introduced by the propagation of the signal in the network. The residual value r(t) is therefore used to determine the network state.

In order to constrain the Kalman filter to estimate only the clock skew a threshold value $T_J$ is set for residual values that may be used to update the Kalman filter. When a residual value calculated from the measured delay of a data packet is large, and above a predetermined threshold $T_J$, it may be assumed that the clock skew delay is only a small component of the delay in the arrival in the packet. Accordingly, if the residual value r(t) is larger than the threshold value $T_J$ the residual value is not used to update the Kalman filter.

According to an embodiment of the invention a statistical model known as a Hidden Markov Model (HMM) is used to determine the network state from the residual values generated by the Kalman Filter.

Using the HMM to determine the state, first involves setting the probability that for a certain value of r(t) the network is in either a good state or a bad state. This is referred to as the state emission probability, according to:

$$B(i) = P\langle r(t) | s(t) = i \rangle \qquad \text{Equation (1)}$$

wherein s(t) is the state and B(i) is the emission probability of the state, where i=1 indicates a good state and i=2 indicates a bad state.

If the residual value is greater than the threshold value $T_J$, the network is assumed to be in a bad state, that is, the delay introduced by the network is high. Accordingly if residual value is greater than the threshold value $T_J$ the emission probability that the measure delay occurred during a good network state is set to zero, whereas the emission probability that the delay occurred during a bad network state is set to one. That is;

$$B(1) = 0, \ B(2) = 1 \text{ for } r(t) > T_J \qquad \text{Equation (2)}$$

If however the residual value is less than the threshold value $T_J$ the emission probability that the observed transmission delay occurred during a good network state is set to be greater than the emission probability that the delay occurred during a bad network state, that is;

$$B(1) > B(2), \text{ for } r(t) < T_J \qquad \text{Equation (3)}$$

The emission probability that the network is not in a bad state during a measured delay that produces a residual value r(t) that is less than the threshold value is not simply set to zero in this case since it is possible that the network is in a bad state for smaller values of r(t) as illustrated by the example where data packets arrive in bursts.

Given the emission probabilities B(i), the probability of a state changing is used to determine the probabilities α(i,t) that the network is in a particular state. The probabilities of a state changing are known as the state transition probabilities, represented by a matrix A. The state transition probabilities A are updated as the data packets are received as will be explained hereinafter. The probability α(i,t) that the network is in a particular state is defined as:

$$\alpha(i,t) = P\langle s(t) = i | r(1) \ldots r(t), A, T_J \rangle \qquad \text{Equation (5)}$$

FIG. 3 shows the probabilities of a bad state, α(2,t), together with the Kalman filter residual r(t).

In one embodiment of the invention values of α(i,t) may be used control how the statistics representing when the network are stored. In particular the statistics when the network is in a good state as indicated by α, may be tracked separately from the statistics when the network is in a bad state. For example, separate histograms representing the distribution of values of r(t) when the network is in a good state and when the network is in a bad state may be generated, as described in the following.

The values of α(i,t) are used to control the updating of a good state histogram and bad state histogram. In one embodiment an exponential forgetting factor may be used to update the histograms, such that the updated histograms are representative of recent events in the network. If the probability that the network is in a good state is greater than 50%, that is if α(1,t)>0.5, the good state histogram is updated with the value of r(t), otherwise the bad state histogram is updated.

Similarly the values of α(1,t) may be used to update the state transition probability matrix A. For example, if two consecutive values of α indicate that the probability of a good state is greater than 50% the probability for a state transition between two good states P(s(t+1)=1|s(t)=1) is increased. Similarly a forgetting factor may be applied to these statistics such that the state transition probability matrix is representative of recent events in the network.

In order to determine the target jitter buffer delay the probable detected state of the network indicated by α is used together with the statistics generated for each network state.

In one embodiment of the invention the histogram corresponding to the probable state of the network is used to determine the target jitter buffer delay by selecting the delay that corresponds to a preselected frequency of late packets.

Alternatively the target jitter buffer delay may be determined by considering the probable state of the network with statistics for the observed delay in each network state, as will now be described.

According to an embodiment of the invention, the expected delay of the packet that has not yet arrived may be predicted using the statistics relating to the good and bad network states. In particular, a probability density function for the expected delay of the next packet may be determined using at least some of these statistics.

A probability density function represents a probability distribution in terms of integrals, where the total of the integral is 1. A probability density function of the state of the network may approximated to a histogram depicting relative frequencies for the values of r(t). Accordingly if the network is currently determined to be in a good state, that is α(1,t)>0.5, the probability density function for the expected delay p_g of the next frame is given by:

$$p\_g = P(s(t+1)=1|s(t)=1)*hist\_g + P(s(t+1)=2|s(t)=1)*hist\_b, \qquad \text{Equation (6)}$$

where hist_g is the histogram updated for good states, hist_b is the histogram updated for bad states, P(s(t+1)=1|s(t)=1) is the state transition probability for a transition between a good state and a good state and where P(s(t+1)=2|s(t)=1) is the state transition probability for a transition between a good state and a bad state.

By comparing the probability density function of the expected delay of the arrival of the next frame to the current jitter buffer delay, the probability of missing a data packet at the time it is needed in the decoding, for different jitter buffer delays may be determined. From these probabilities a reasonable target delay is determined, and a delay adjustment delayRQ may be calculated according to Equation (7):

$$delayRQ = \text{target delay} - \text{current delay} \quad \text{Equation (7)}$$

According to a further embodiment of the invention, the statistics relating to the network may also be used to predict when the network will next be in a bad state. Referring to FIG. 3, delay spikes 30 can be seen which indicate that the network is in a bad state. The inventors of the present invention have identified that for some networks, and especially for WLAN (wireless local area network), delay spikes 30 occur with a substantially constant interval, and as such it is possible to predict the spikes well in advance.

Each frame contained in the payload of a data packet has a sequence number which corresponds to the order of the frame in the signal. According to an embodiment of the present invention, the sequence numbers of frames that are received when a state transition from good to bad occurs are stored. Preferably, only the sequence numbers for a predetermined number of the most recent of these frames are stored.

For the network delay illustrated in FIG. 3 it can be seen that the good to bad transitions (g2b) occurred at the following frame sequence numbers:

$$g2b = [7226, 7382, 7482, 7738, 7882, 7994] \quad \text{Equation (8)}$$

According to an embodiment of the invention the differences between consecutive stored frame sequence numbers [7226, 7382, 7482, 7738, 7882, 7994] are analysed to determine if the spikes occur periodically. The periodicity of the interval may occur between two consecutive spikes, or every nth spike. The periodicity may not occur between consecutive spikes if there is more than one connection between the terminal and the network—causing more than one set of periodic spikes, or if there are additional random variations in the state of the network.

In Matlab notation the difference (dg2b) between the packet numbers occurring at consecutive spikes may be represented as:

$$dg2b = g2b(2:end) - g2b(1:end-1) = [156\ 100\ 256\ 144\ 112] \quad \text{Equation (9)}$$

The candidate interval is first considered to be the maximum interval vector 256. Since this period starts at frame sequence number 7482, it is checked if a delay spike also occurs at 7482−256=7226, and at 7482+2*256=7994. Since the delay spikes do indeed occur at these frame sequence numbers the candidate vector is considered to be the interval of the periodicity.

The determined interval of the periodicity is used to predict the future frame sequence numbers where a delay spike will occur. The next spike is therefore predicted to occur at 7994+256=8250.

In one embodiment of the invention it is not necessary that the actual spike occurs at exactly the same frame as the predicted spike. This is accounted for by allowing a small margin.

According to an embodiment of the invention, a signal d(t) indicating the delay observed between arriving frames is input into the Kalman filter block 40. The Kalman filter block 40 is arranged to filter the signal d(t) as described above to generate a residual value r(t). The residual value r(t) is output as a signal r(t) to the state emission probability block 41. As described previously, if the residual value is less than a threshold value $T_J$, the residual value is used to update the Kalman filter.

The implementation of an embodiment of the present invention will now be described with reference to FIG. 4.

Figure 4:
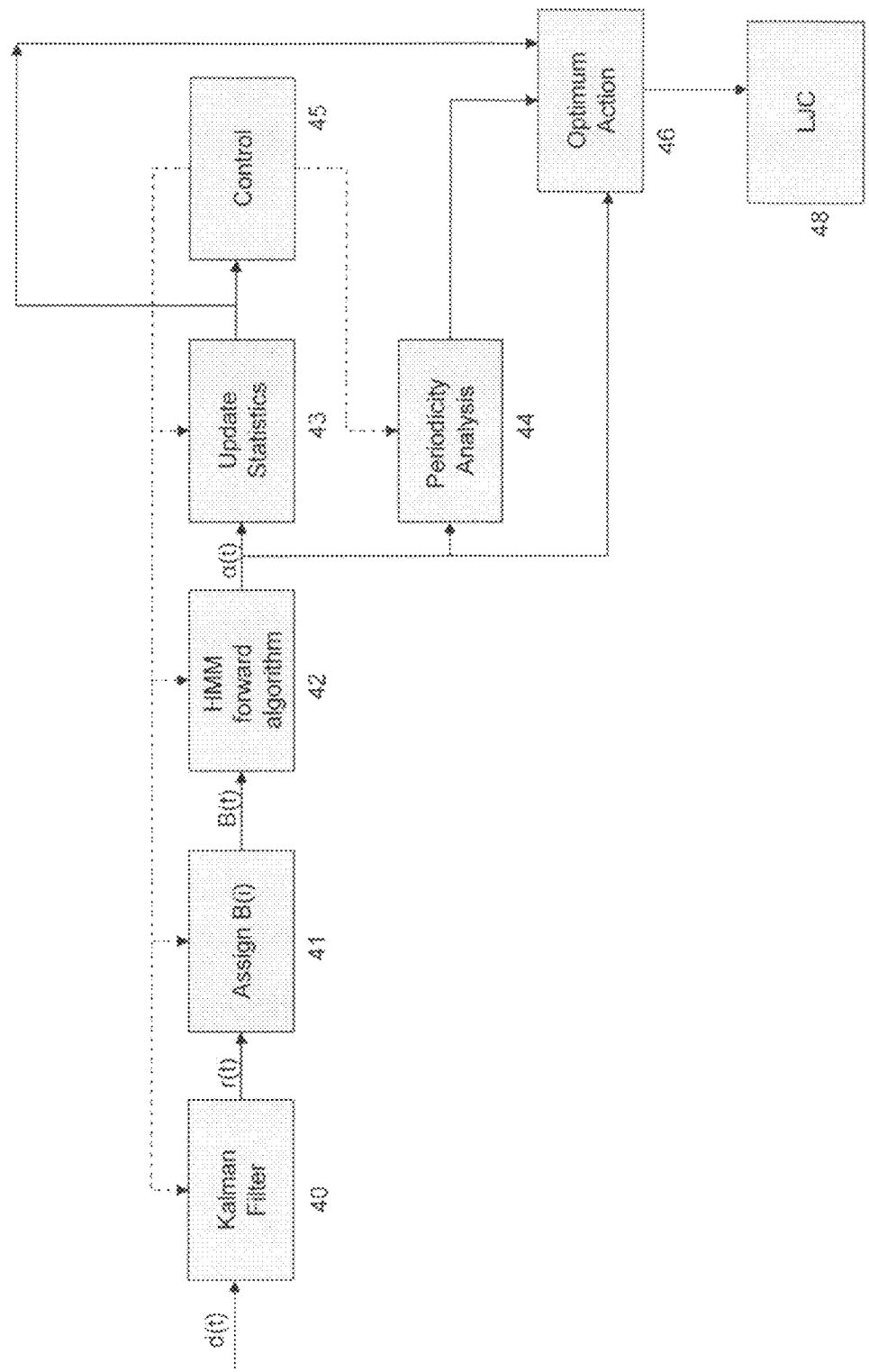
FIG. 4 is a block diagram of an embodiment of the invention.
Figure 5:
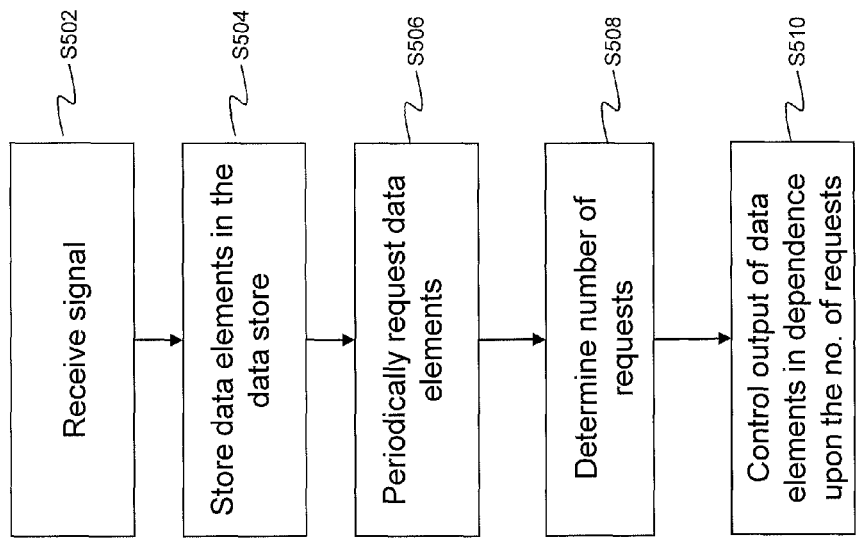
FIG. 5 is an example method of an embodiment of the invention.

FIG. 4 shows the control circuitry for the receiver in the terminal 112. The control circuitry comprises a Kalman filter block 40, an state emission probability assignment block 41, an HMM forward algorithm block 42, an update statistics block 43, a periodic analysis block 44, a control block 45 and an optimum action block 46.

According to an embodiment of the invention, a signal d(t) indicating the delay observed between arriving frames is input into the Kalman filter block 40. The Kalman filter block 40 is arranged to filter the signal d(t) as described above to generate a residual vale r(t). The residual value r(t) is output as a signal r(t) to the state emission probability block 41. As described previously, if the residual value is less than a threshold value $T_J$, the residual value is used to update the Kalman filter.

At the emission probability assign block 41 a state emission probability B(i) is assigned for each residual value r(t) input from the Kalman filter block 40. The emission probability assign block 41 is then arranged to output the assigned emission state probability values B(i) to the HMM forward algorithm block 42.

The HMM forward algorithm block 42 uses the state emission probability values and the transition probability A to generate the probability value α for a good state and a bad state according to Equation (5). The initial vales values of A may be set as default values, after which the updated transition probability matrix will be input to the HMM forward algorithm block 42 from the update statistics block 43.

The probability values α generated by the HMM forward algorithm block 42 are input into the update statistics block 43. At the update statistics block 43 statistics of the probability values α are determined. In particular the histograms hist_g for a good network state and hist_b for a bad network state are updated in accordance with the method described above. The transition probability matrix A is also updated at the update statistics block 43. The statistics are output to the optimum action block 46 and to the control block 45.

The probability values α generated by the HMM forward algorithm block 42 are also input into a periodicity analysis block 44. The periodicity analysis block is arranged to store the value of the most recent packet sequence numbers that correspond to a delay spike. The periodicity analysis block determines the periodicity according to the method described above. When the periodicity has been determined, the periodicity analysis block is arranged to output an indication of the frame/packet sequence numbers for which a delay spike is predicted to the optimum action block 46.

The optimum action block 46 is arranged to determine the target jitter buffer delay in dependence on the probable state of the network indicated by the values of α input from the HMM algorithm block and the statistics provided from the update statistics block 43, as described above. When a spike is predicted by the periodic analysis block 44 the optimum action block will determine that the target delay should be increased before the expected spike occurs. The target delay is compared to the current delay to determine how the delay should be adjusted. The action required to adjust the delay is then output to a decoder. An LJC (Loss and Jitter Concealment) unit 48 which may be integrated with the encoder is arranged to carry out the action on the received signal to apply the adjustment.

The LJC unit 48 may adjust the delay by either inserting a concealment frame based on one or more previous frames to increase the delay or by skipping a frame to decrease the delay. Alternatively the LJC unit may adjust the delay by adjusting the play out duration of one or more frames, For example, if the frame length is 20 ms the LJC unit may stretch the frame to 30 ms to increase the delay by 10 ms, or compress the frame to 10 ms to decrease the delay by 10 ms.

The control block 45 is arranged to control the operations performed by the components of the control circuitry to prevent any unusual network behaviour from causing errors in the way in which the network is modelled. According to an embodiment of the invention the control block is arranged to perform at least some of the following operations:

In one embodiment of the invention the control block 45 is arranged to control the updates of the state transition probability matrix to prevent the probability of a state transition from becoming zero.

In one embodiment the control block 45 is arranged to monitor the frequency that a bad network state is detected. If the frequency that a bad network state is detected is below a minimum expected frequency, for example if a bad network state is not detected, the control block 45 is arranged to slowly decrease threshold value $T_J$, until the frequency that the bad network state is detected is increased. This facilitates a "lean" jitter buffer under very good network conditions Conversely, if the frequency that a bad network state is detected is above a maximum expected frequency, the control block 45 is arranged to slowly increase the threshold value $T_J$ until the frequency that the bad network states are detected is reduced.

In an alternative embodiment of the invention if a good network state has not been visited for time exceeding a predetermined threshold the control block 45 may determine that the estimation of the clock skew delay provided by the Kalman filter block 40 is unreliable. In this case the control block is arranged to set the estimate of the clock skew delay to the minimum most recently observed delays.

In another embodiment the control block 45 may be arranged to monitor if a delay spike actually occurred at the packet sequence number predicted by the periodic analysis block. If the expected delay spike did not occur the determined periodicity interval is cleared.

In one embodiment of the invention the optimised action block is arranged to analyse characteristics the signal at the LJC unit 48 to determine if the delay should be applied. In one embodiment of the invention if the characteristics of the signal indicate that the signal will be distorted if the delay is adjusted the LJC unit is not instructed to apply the delay. However in a preferred embodiment of the invention the optimised action block is additionally arranged to assess the urgency of adjusting the delay. For example, in the case where a delay spike is expected the delay may be adjusted even if adjusting the delay causes the signal to be distorted.

In an alternative embodiment of the invention the state of the network may be detected before a packet indicating that the network is in a bad state arrives. According to the methods described previously the state of the network is indicated by the observed delay of a received packet. Accordingly the delay in the arrival of a packet which indicates that the network is in a bad state will not be observed until the packet actually arrives at the terminal. In accordance with one embodiment of the invention it is possible to determine that the network is in a bad state before the arrival of the packet that indicates that the network is in a bad state. This may be achieved by determining if the time after receiving the last packet exceeds the threshold value $T_J$ before receiving the next packet. If so the network may be assumed to be in a bad state.

In one embodiment of the invention the observed transmission delay may relate to the time between the arrival of consecutive packets. The time after receiving the last packet may be measured directly by timing from when the last packet arrived, however this places some burden on the processing resources of the terminal. In preferred embodiment the time after receiving the last packet may be determined from the number of 'get' calls to retrieve a packet from the jitter buffer storage since the last 'put' operation to place a packet in the jitter buffer storage.

According to one embodiment of the invention the delay in the arrival of a data packet is determined from the time of arrival of the data packet as indicated by a timer in the central processing unit (CPU) of the terminal 112. In an alternative embodiment of the invention the time between receiving data packets may be determined by establishing the number of 'get' calls to retrieve a packet from the jitter buffer storage since the last data packet arrived. Since the number of 'get' calls occur at regular intervals, the number of calls corresponds to the delay in the arrival of the packet.

In embodiments of the present invention the required processing may be implemented as hardware or by using appropriately adapted software executed on a processor. Software for implementing the invention may be stored on and provided by means of a carrier medium such as a carrier disc, card or tape. A possibility is to download the software via a data network. This is an implementation issue.

While this invention has been particularly shown and described with reference to preferred embodiments, it will be understood to those skilled in the art that various changes in form and detail may be made without departing from the scope of the invention as defined by the claims.

What is claimed is:

1. A method comprising:
    receiving a signal at a receiving terminal from a network, the signal comprising a plurality of data elements;
    determining a transmission delay of at least one data element of the plurality of data elements;
    estimating a first component of the transmission delay, the first component including a clock skew delay component of the transmission delay;
    determining a second component of the transmission delay by removing the first component including the clock skew delay component of the transmission delay from the transmission delay;
    determining a receiver jitter buffer delay to be applied at the receiving terminal between receiving one of said plurality of data elements at the receiving terminal from the network and outputting the data element from the receiving terminal, the determining the receiver jitter buffer delay based on the second component of the transmission delay and not based on the first component including the clock skew delay component of the transmission delay; and
    determining a network propagation state of the network based on the second component, and updating statistics associated with the determined network propagation state of the network.

2. A method as claimed in claim 1 wherein the first component of the transmission delay is the clock skew delay component.

3. A method as claimed in claim 1 wherein the step of estimating the first component of the transmission delay comprises updating a model of the first component of the transmission delay using a previous transmission delay for at least one previously received data element.

4. A method as claimed in claim 3 wherein the transmission delay of the at least one data element is used to update the model if it is below a predetermined threshold.

5. A method as claimed in claim 4 wherein the transmission delay of the at least one data element is not used to update the model if it is above a predetermined threshold.

6. A method as claimed in claim 3 wherein the model comprises a filter.

7. A method as claimed in claim 6 wherein the step of determining the second component of the transmission delay comprises filtering the transmission delay with the filter to remove the first component of the transmission delay.

8. A method as claimed in claim 7 wherein filtering the transmission delay generates a residual value representing the second component of the transmission delay.

9. A method as claimed in claim 1 wherein the second component is a network propagation delay component.

10. A method as claimed in claim 1 wherein the determining the network propagation state further comprises determining whether the network propagation state is in a first network propagation state or a second network propagation state, and wherein the updating the statistics further comprises updating a first set of statistics associated with the first network propagation state if it is determined that the network propagation state is in the first network propagation state, or updating a second set of statistics associated with the second network propagation state if it is determined that the network propagation state is in the second network propagation state.

11. A method as claimed in claim 10 wherein the receiver jitter buffer delay is determined from the first set of statistics associated with the determined first network propagation state or from the second set of statistics associated with the determined second network propagation state.

12. A method as claimed in claim 10 wherein the step of determining the network propagation state comprises determining a probability that the first network propagation state or the second network propagation state exists.

13. A method as claimed in claim 12 wherein if the second component is below a threshold value, determining that the probability that the first network propagation state exists is higher than the probability that the second network propagation state exists.

14. A method as claimed in claims 12 wherein the probability that the first network propagation state exists is used to control how the first set of statistics and the second set of statistics are updated.

15. A method as claimed in claim 12 wherein the probability that the first network propagation state exists is determined from a hidden markov model (HMM).

16. A method as claimed in claim 15 wherein the first network propagation state and the second network propagation state are states in the hidden markov model.

17. A method as claimed in claim 10 wherein the step of determining the network propagation state comprises determining a probability of a transition between the first network propagation state and the second network propagation state.

18. A method as claimed in claim 17, wherein the probability that the first or second network propagation state exists is determined from the second component and from the probability of the transition between the first network propagation state and the second network propagation state.

19. A method as claimed in claim 18 wherein the probability of the transition between the first network propagation state and the second network propagation state is defined as a matrix.

20. A method as claimed in claim 10 wherein characteristics of the received signal indicate that the second network propagation state occurs periodically.

21. A method as claimed in claim 10 wherein the second network propagation state is predicted by:
  determining a constant periodicity value between each occasion that the second network propagation state occurs; and
  using the constant periodicity value to predict occasions when the second network propagation state will occur.

22. A method as claimed in claim 21, wherein the constant periodicity value determines a number of frames between the occasions that the second network propagation state will occur.

23. A method as claimed in claim 1 wherein the at least one data element of said plurality of data elements is an expected data packet that has not yet been received at the receiving terminal.

24. A method as claimed in claim 1 wherein the step of determining the receiver jitter buffer delay comprises:
  determining a probability distribution of a delay of an expected packet.

25. A method as claimed in claim 1 wherein the first component is estimated by a Kalman filter.

26. A computer readable medium, not comprising a signal, storing instructions that, when executed by one or more processors, causes the one or more processors to perform a method comprising:
  receiving a signal at a receiving terminal, the signal comprising a plurality of data elements;
  determining a transmission delay of at least one data element of the plurality of data elements;
  estimating a first component of the transmission delay, the first component including a clock skew delay component of the transmission delay;
  determining a second component of the transmission delay by removing the first component including the clock skew delay component of the transmission delay from the transmission delay;
  determining a receiver jitter buffer delay to be applied at the receiving terminal between receiving one of said plurality of data elements at the receiving terminal from the network and outputting the data element from the receiving terminal, the determining the receiver jitter buffer delay based on the second component of the transmission delay and not based on the first component including the clock skew delay component of the transmission delay; and
  determining a network propagation state of the network based on the second component, and updating statistics associated with the determined network propagation state of the network.

27. A device comprising:
  a receiver configured to receive a signal from a network, the signal comprising a plurality of data elements;
  a determiner configured to determine a transmission delay of at least one data element of the plurality of data elements;
  an estimator configured to estimate a first component of the transmission delay, the first component including a clock skew delay component of the transmission delay, and to determine a second component of the transmission delay by removing the first component including the clock skew delay component of the transmission delay from the transmission delay;

a jitter buffer delay unit configured to apply a receiver delay between receiving one of said data elements at the device from the network and outputting the data element from the device, the receiver delay based on the second component of the transmission delay and not based on the first component including the clock skew delay component of the transmission delay; and the device configured to determine a network propagation state of the network based on the second component, and to update statistics associated with the determined network propagation state of the network.

* * * * *